US010497272B2

United States Patent
Nedivi

(10) Patent No.: US 10,497,272 B2
(45) Date of Patent: Dec. 3, 2019

(54) APPLICATION FOR INTERACTIVE LEARNING IN REAL-TIME

(71) Applicant: BROADBAND EDUCATION PTE. LTD., Singapore (SG)

(72) Inventor: Raanan Nedivi, Singapore (SG)

(73) Assignee: BROADBAND EDUCATION PTE. LTD., Singapore (SG)

( * ) Notice: Subject to any disclaimer, the term of this patent is extended or adjusted under 35 U.S.C. 154(b) by 0 days.

(21) Appl. No.: 16/015,203

(22) Filed: Jun. 22, 2018

(65) Prior Publication Data

US 2018/0301046 A1     Oct. 18, 2018

Related U.S. Application Data

(63) Continuation-in-part of application No. 15/821,828, filed on Nov. 23, 2017, now abandoned.

(60) Provisional application No. 62/425,625, filed on Nov. 23, 2016.

(51) Int. Cl.

| | |
|---|---|
| G09B 5/02 | (2006.01) |
| H04L 29/06 | (2006.01) |
| G09B 5/06 | (2006.01) |
| H04W 4/08 | (2009.01) |
| H04L 29/08 | (2006.01) |
| H04W 4/06 | (2009.01) |
| H04L 12/58 | (2006.01) |
| G06F 3/0482 | (2013.01) |
| H04W 4/14 | (2009.01) |
| H04W 4/21 | (2018.01) |

(52) U.S. Cl.
CPC ............ *G09B 5/02* (2013.01); *G09B 5/06* (2013.01); *H04L 51/046* (2013.01); *H04L 65/403* (2013.01); *H04L 67/22* (2013.01); *H04W 4/06* (2013.01); *H04W 4/08* (2013.01); *G06F 3/0482* (2013.01); *H04L 51/04* (2013.01); *H04L 67/1095* (2013.01); *H04W 4/14* (2013.01); *H04W 4/21* (2018.02)

(58) Field of Classification Search
CPC ..... G09B 5/02; H04L 67/1095; H04L 65/403; G06F 3/0482
See application file for complete search history.

(56) References Cited

U.S. PATENT DOCUMENTS

| | | | |
|---|---|---|---|
| 8,190,590 B2 * | 5/2012 | Lawlor | ............ G09B 5/00 707/706 |
| 8,602,793 B1 | 12/2013 | Sniedzins | |
| 9,280,400 B2 | 3/2016 | Boskovic | |

(Continued)

*Primary Examiner* — William L Bashore
*Assistant Examiner* — Gregory A Distefano
(74) *Attorney, Agent, or Firm* — Horizon IP Pte. Ltd.

(57) ABSTRACT

A system comprising a learning platform having a learning management system in communication with a content management system is described herein. The system presents, by a processing device, a live event provided by the learning platform. The live event having a performance by a performer. The live event is presented on screens of client devices associated to a group of viewers viewing a stream of the live event. A native real-time rating interface provided by the learning platform is presented on the screens of the client devices of the group of viewers. The real-time rating interface is operable by the viewers at any instance of time during the stream of the live event to rate the performance of the performer.

20 Claims, 6 Drawing Sheets

(56) References Cited

U.S. PATENT DOCUMENTS

| | | | |
|---|---|---|---|
| 2001/0043697 A1* | 11/2001 | Cox | H04M 3/36 |
| | | | 379/265.06 |
| 2003/0152904 A1* | 8/2003 | Doty, Jr. | G09B 7/00 |
| | | | 434/350 |
| 2007/0195944 A1* | 8/2007 | Korenblit | G06Q 10/06 |
| | | | 379/265.06 |
| 2008/0050715 A1 | 2/2008 | Golczewski | |
| 2008/0082394 A1* | 4/2008 | Floyd | G06F 17/30943 |
| | | | 705/7.32 |
| 2009/0075247 A1* | 3/2009 | Tucci | G09B 7/02 |
| | | | 434/362 |
| 2011/0055100 A1* | 3/2011 | Perreault | G06Q 10/10 |
| | | | 705/327 |
| 2013/0071087 A1 | 3/2013 | Motiwala | |
| 2013/0204675 A1* | 8/2013 | Dobell | G06Q 10/10 |
| | | | 705/7.42 |
| 2013/0282446 A1 | 10/2013 | Dobell | |
| 2014/0272896 A1* | 9/2014 | Malik | G09B 5/125 |
| | | | 434/350 |
| 2014/0335497 A1 | 11/2014 | Gal | |
| 2015/0118672 A1 | 4/2015 | Yeskel | |
| 2015/0199910 A1* | 7/2015 | Patel | G09B 5/08 |
| | | | 434/362 |
| 2016/0149967 A1 | 5/2016 | Lewis | |
| 2017/0004718 A1 | 1/2017 | Kern | |

\* cited by examiner

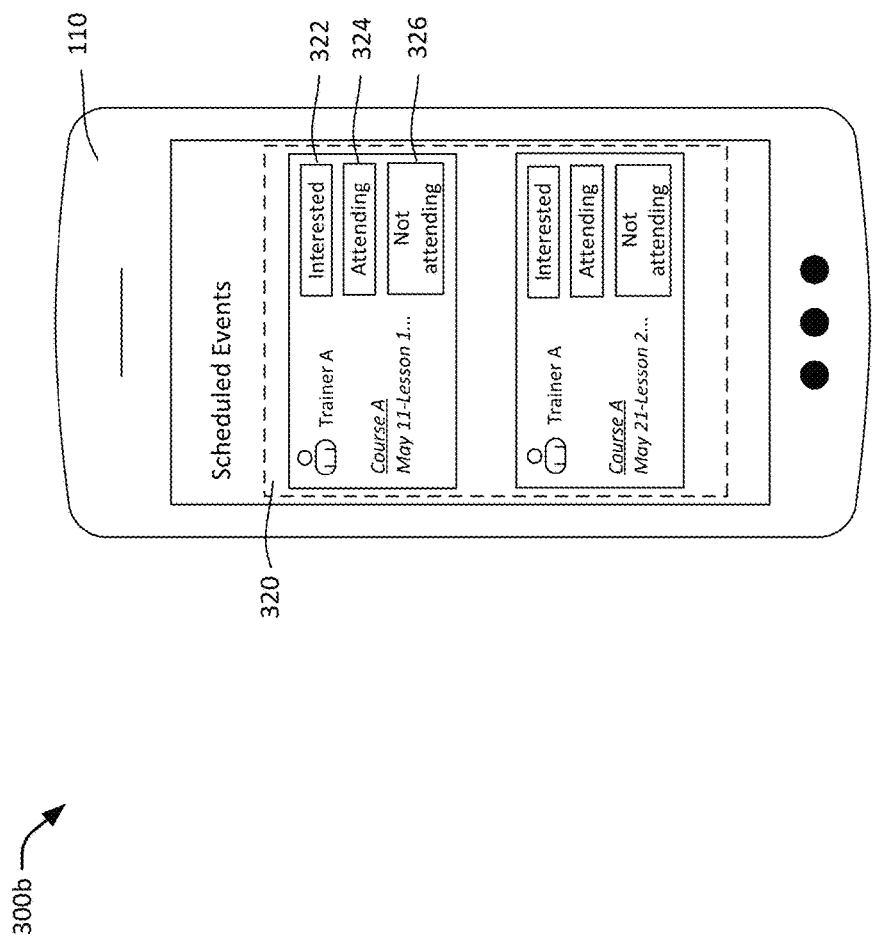

APPLICATION FOR INTERACTIVE LEARNING IN REAL-TIME

CROSS-REFERENCE TO RELATED APPLICATION

This application is a continuation-in-part application of co-pending U.S. patent application Ser. No. 15/821,828, filed on Nov. 23, 2017, which claims the benefit of U.S. Provisional Application Ser. No. 62/425,625, filed on Nov. 23, 2016. All disclosures are herein incorporated by reference in their entireties for all purposes.

FIELD OF THE INVENTION

The present invention is generally related to a networked platform for interactive learning. More specifically, the present invention is directed to an interactive virtual learning platform for multiple end-users.

BACKGROUND

The development and deployment of technological social networking systems and the possibility of instant reach to information, particularly in a wireless environment has changed the way people learn and communicate today. Furthermore, mobile devices have become ubiquitous in today's society. Many people use mobile devices such as personal digital assistants (PDAs), laptops, tablet devices or any smart device in their daily lives. The development of a networked and connected world has resulted in mushrooming of social networks, which grant end-users the opportunity to connect with others in ways not possible before. However, little has been done towards providing people with a virtual learning platform that encourages social interaction between end-users.

Accordingly, there is a need for a computer implemented method and system that provides a learning experience through combining interactive learning opportunities with social interaction to provide the learner with higher levels of interest and involvement during learning activities.

SUMMARY

The present disclosure describes example systems and methods to facilitate remote learning, remote teaching and remote evaluation during a live event. The disclosed example systems and methods may be more effective than conventional remote learning and teaching methods.

In one implementation, a method is presented. The method includes a learning platform. The learning platform comprises a learning management system and a content management system in communication with the learning management system. A live event provided by the learning platform is presented by a processing device. The live event having a performance by a performer. The live event is presented on screens of client devices associated to a group of viewers viewing a stream of the live event. A native real-time rating interface provided by the learning platform is presented on the screens of the client devices of the group of viewers. The real-time rating interface is operable by the viewers at any instance of time during the stream of the live event to rate the performance of the performer.

In another implementation, a system is presented. The system includes a memory and a processing device coupled to the memory. The processing device presents a live event provided by a learning platform. The learning platform comprises a learning management system and content management system in communication with the learning management system. The live event having a performance by a performer. The live event is presented on screens of client devices associated to a group of viewers viewing a stream of the live event. A native real-time rating interface provided by the learning platform is presented on the screens of the client devices of the group of viewers. The real-time rating interface is operable by the viewers at any instance of time during the stream of the live event to rate the performance of the performer.

In yet another implementation, a non-transitory computer readable storage medium including instructions that, when executed by a processing device, cause the processing device to perform operations including presenting, by the processing device, a live event provided by a learning platform. The learning platform comprises a learning management system. The live event having a performance by a performer. The live event is presented on screens of client devices associated to a group of viewers viewing a stream of the live event. A native real-time rating interface provided by the learning platform is presented on the screens of the client devices of the group of viewers. The real-time rating interface is operable by the viewers at any instance of time during the stream of the live event to rate the performance of the performer.

These and other advantages and features of the systems and methods herein disclosed, will become apparent through reference to the following description and the accompanying drawings. Furthermore, it is to be understood that the features of the various implementations described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of various implementations. In the following description, various implementations of the present disclosure are described with reference to the following, in which:

FIGS. 3a-3d show exemplary illustrations of an interface screen that can be output for display in accordance with various implementations of the system described in FIGS. 1-2.

DETAILED DESCRIPTION

A framework for an interactive learning system and method is described herein. In particular, the present disclosure relates to a learning system and method that integrates live online learning and self-paced learning within a digital learning platform. In some implementations, the digital learning platform allows learners to access learning materials maintained in the platform at any time, and attend multiple scheduled live events remotely. The scheduled live events are, for example, hosted by the digital learning platform described herein, which integrates a stream of the live events along with one or more native interface elements to provide an interactive learning experience for learners attending the live events remotely.

Some embodiments provide a techno-pedagogic solution specifically tailored, designed and developed for corporate or business needs or users, or for academic needs and users.

Some embodiments provide relevant learning objects and learning activities that are interactive, thereby encouraging the learner to be actively involved in the learning process; and constructive, assisting knowledge building. A learner's pedagogic goals are supported and assisted by the adaptive learning platform described herein, which selectively allocates and assigns various digital learning objects and learning activities to learners, or to groups of learners, according to the courses (e.g., learning programs, curriculum) associated to each learner.

Some embodiments are adapted to improving learners' learning effectiveness by motivating trainers to develop higher levels of teaching competencies, which include: knowledge building skills; ability to build skills and competencies of learners; ability to adapt the teaching process to learning needs; and ability to dynamically adopt suitable pedagogical approaches to efficiently teach different groups of learners having different learning competencies. For example, each learner is able to provide feedback on the trainer's performance, or the learner's satisfaction level, for a learning/teaching activity.

Some embodiments are adapted to evaluate a learner's performance after completion of a course provided on the learning platform described herein. Accordingly, some embodiments provide a solution for receiving practical feedback on the effectiveness of a course (e.g., learning program, curriculum) provided on the learning platform.

Figure 1:
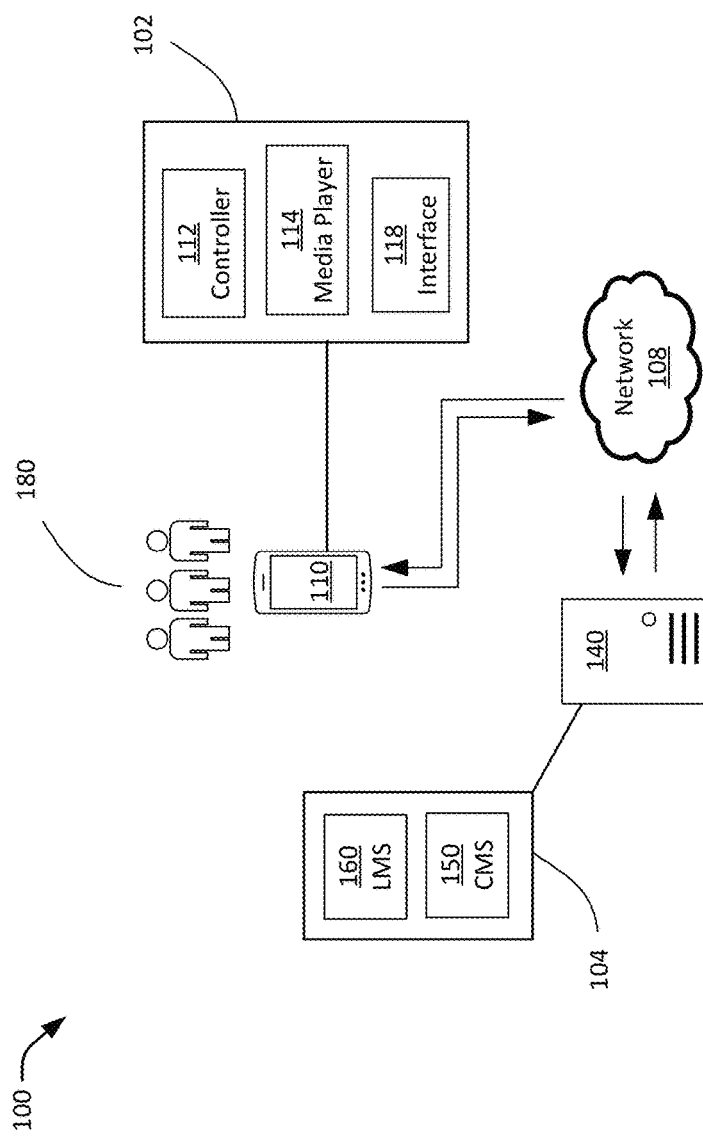
FIG. 1 shows a simplified diagram of a system implemented within a computerized learning environment.

FIG. 1 shows a simplified diagram of a learning system 100, according to an exemplary implementation. The system 100 may include one or more components, modules or layers, which may be implemented using software and/or hardware, optionally across multiple locations or using multiple devices or units. An overview of the system 100 is described in relation to FIG. 1. Thereafter, a more detailed description of the system 100 is provided in relation to remaining figures.

The system 100 can each be implemented as a single system, multiple systems, distributed systems, or in any other form. In one implementation, the system 100 includes a digital learning platform (hereinafter "learning platform") having a frontend system (e.g., presentation layer) 102 and a backend system 104 (e.g., data access layer) in communication with the frontend system 102. The frontend system, for example, runs on client device 110. The client device 110 illustrated in FIG. 1 is a representative of a large number of client devices that can be included in the system 100.

The client device 110 can be any manner of computer or computing device with, for example, local memory and processor. A memory may be volatile or non-volatile types of non-transitory computer-readable media, such as magnetic media, optical media, random access memory (RAM), read-only memory (ROM), removable media, or any other suitable local or remote memory unit. The memory can include digital data that can be accessed by the processor. A processor may be any type of device, or multiple devices, capable of manipulating or processing information from a non-transitory computer-readable media (e.g., a memory). For example, a processor includes a central processing unit (CPU) for processing computer-executable program instructions to perform one or more processes. Various types of portable and/or non-portable computing devices may serve as client device 110. For example, the term "client device" as used herein includes a personal computer (PC), a workstation, a computer station, a network computer, a kiosk or a mobile computing device, such as smart phones, PDAs (personal digital assistants), portable media players, tablet computers, or laptops. Other types of computing devices may also be used.

In one exemplary implementation, the client device 110 is a mobile computing device, such as a smart phone and/or laptop. The client device 110 may include, for example, a processor, a memory, a network communication connector, a display screen, a camera, a speaker and a microphone. Providing other features for the client device may also be useful.

One or more client device 110 may be associated with an end-user 180 (hereinafter "user") of the system 100. For example, a user 180 interacts (or interfaces) with the system 100 using the client device 110 associated to the particular user. The user 180 illustrated in FIG. 1 is representative of a large number of end-users that can be included in the system 100. A user 180 may download the frontend system 102 to a client device 110 associated with the particular user 180 as a computer application (hereinafter "App"). For example, the frontend system (or App) 102 resides on the client device 110. The App may include software components in the form of computer executable program instructions (hereinafter "computer instructions") for implementing or running the App on the client device 110. The computer instructions may further specify a unique name and/or logo for the App. The App is installed and displayed at the client device 110 using the unique name and/or logo. In one implementation, the frontend system 102 is a mobile application. The App, for example, may be a native mobile application downloaded from an online App store or marketplace and directly installed onto the client device 110. In an alternative implementation, the frontend system may be a web-based application (hereinafter "web app"). A web app is, for example, an Internet-enabled app that is accessed through the client device's web browser. Other configurations of the App may also be useful.

The App 102 is able to interface with the client device's 110 resources, such as native features, information and hardware. In one implementation, the App 102 includes a controller module 112, a media player module 114 and an interface module 118. For example, the controller module 112 may control the interface between various modules of the App 102 and the client device's 110 resources, including camera, microphone and speaker, as further described in conjunction with FIGS. 3a-3d. As used herein, the term "module" refers to programming modules executed by computing systems (e.g., processors) that are part of the system 100, including client device 110 and server computers 140.

In one implementation, when the App is running on the client device 110, the interface module 118 will display the App as a full screen application and provide access to the learning activities, learning objects, information and functionalities implemented in the system 100. The interface module 118 presents information output for display on the screen of the client device 110, which allows the user 180 to navigate the system 100 and interact with the components, modules, layers or digital content therein. For example, the interface module 118 allows a user 180 to select or browse through learning objects stored in the backend system 104, and participate in live events hosted by the backend system 104.

As used herein, the term "learning object" refers to digital content storable on a computing device in any form, such as computer-readable data. A learning object includes, for example, a text document (e.g., text files, word-processing documents, spreadsheets, notes, and presentations), video file, audio file, digital image, or other media file that stores digital content. A learning object may be, for example, subject to viewing, listening, typing, or otherwise interacting (e.g., passively or actively) by a user 180 utilizing a client device 110. For example, a learning object can include audio/video content (e.g., an AVI or MPG or WMV or MOV video file) which is intended for passive viewing/hearing by the user 180, a standalone application (e.g., Flash application or Shockwave application), applet (e.g., a Java applet in which the user 180 is required to type text in response to questions posed), program (e.g., a JavaScript program in which the learner selects answers in a multiple-choice quiz), or the like. Other types of learning objects may also be provided.

In one implementation, the interface module 118 may present a touch-based interface. For example, the interface module 118 allows user 180 to navigate and interact with the system 100, including the frontend and backend systems 102 and 104, by touching native interface elements (e.g., pictures or text) presented on the screen of the client device 110. In alternative implementations, the interface module 118 may present a graphical user interface. For example, a graphical user interface enables the user to navigate and interact with the system 100 through the use of peripheral input devices (e.g., keyboard, mouse etc.). Providing other types of interface modules 118 may also be useful.

In one implementation, digital representations of live events are stored in the system 100 as learning objects. A digital representation of the live event may include digital content (e.g., video file) and/or a stream of digital data (e.g., video data stream). Digital representation of a live event may include a video recording of the live event integrated with other digital content such as, but not limited to, message records. For example, a video recording of an interactive live training event is integrated and synchronized with one or more learner-originated messages presented via a native messaging interface during the live training event to provide a digital representation of the live event, as further described in conjunction with FIG. 3c. In an alternative implementation, a video recording (e.g., video file) of the live learning event may be integrated and synchronized with one or more data structures (e.g., graphs, tabular data, etc.) to provide a digital representation of the live learning event. Integrating a video recording of a live event with other types of digital content with may also be useful.

Live events hosted by the backend system 104 can include interactive learning activities (e.g., live training events) and assessment activities (e.g., quizzes). In one implementation, a video data stream of a live event is presented on the screen of client devices 110 for viewing by users 180 via the media player module 114 embedded in the frontend system 102. The media player module 114 includes, for example, a Flash player or an HTML5 player. Providing other types of media player may also be useful. Learning activities may be associated with a course (e.g., cooking course, customer service course, retail management course), course segment (topics or themes of a course delivered in sequence or in accordance to a designed course structure), or other properties. For example, learning activities may also be associated with one or more groups of learners associated with a course, or associated with each other in some way (e.g., coworkers).

The backend system 104 of the learning platform may be implemented on one or more server computers 140. The server computer 140 illustrated in FIG. 1 may represent multiple computing devices in communication with each other to perform the actions of a server computer (e.g., cloud computing). Alternatively, the server computer 140 may represent a single computing device.

Each server computer 140 can include a processor (e.g., CPU) and memory (e.g., RAM, ROM, etc.), and one or more storage devices storing data structures and/or computer instructions for execution by the processor. For example, each server computer can include one or more computer-readable data stores to facilitate managing app requests from client device 110. Various types of computers may be employed for the server. For example, the computer may be a mainframe, a workstation, as well as other types of processing devices. The memory may include digital data that can be accessed by the processor. The server computer 140 and/or data store may be coupled with various databases or storage devices in the form of any suitable computer readable medium, such as a hard disc drive, a memory device, a flash drive or an optical drive.

In some implementations, the systems and computing devices described herein (e.g., client devices, server computer) are communicably connected to each other by a network 108. The network 108 may include, for example, one or more communications networks of any suitable type in any combination, including wireless networks (e.g., WI-FI network), wired networks (e.g., Ethernet network), local area networks (LAN), wide area networks (WAN), personal area network (PAN), mobile radio communication networks, the Internet, and the like. Further, the network 108 may include one or more network topologies, including a bus network, a star network, a ring network, a mesh network, a star-bus network, a hierarchical network, and the like. It should be appreciated that the server computer 140 may also be in communication with other remote servers or various client devices through other network or communication means.

Communications between the client device 110 and server computer 140 may be facilitated through various communication protocols, including data transmission media communications devices, Transmission Control Protocol (TCP), Internet Protocol (IP), File Transfer Protocol (FTP), Hypertext Transfer Protocol (HTTP), Hypertext Transfer Protocol Secure (HTTPS), Session Initiation Protocol (SIP), Real-Time Transport Protocol (RTP), Global System for Mobile Communications (GSM) technologies, Code Division Multiple Access (CDMA) technologies, Short Message Service (SMS), Long Term Evolution (LTE) technologies, wireless communication technologies, in-band and out-of-band signaling technologies, and other suitable communication networks and technologies.

In some implementations, the system 100 includes one or more communication interfaces (not shown) to facilitate communications between the frontend system 102 and backend system 104 using the various communication protocols. A communication interface may include hardware and/or software. In one implementation, the communication interface may include digital signal processing circuitry to provide one or more interfaces for communication (e.g., packet-based communication) between computing devices or networks. For example, a communication interface may include a network interface controller (MC) or network adapter for communicating with an Ethernet or other wire-based network or a wireless MC (WNIC) or wireless adapter for communicating with a wireless network, such as a WI-FI.

Figure 2:
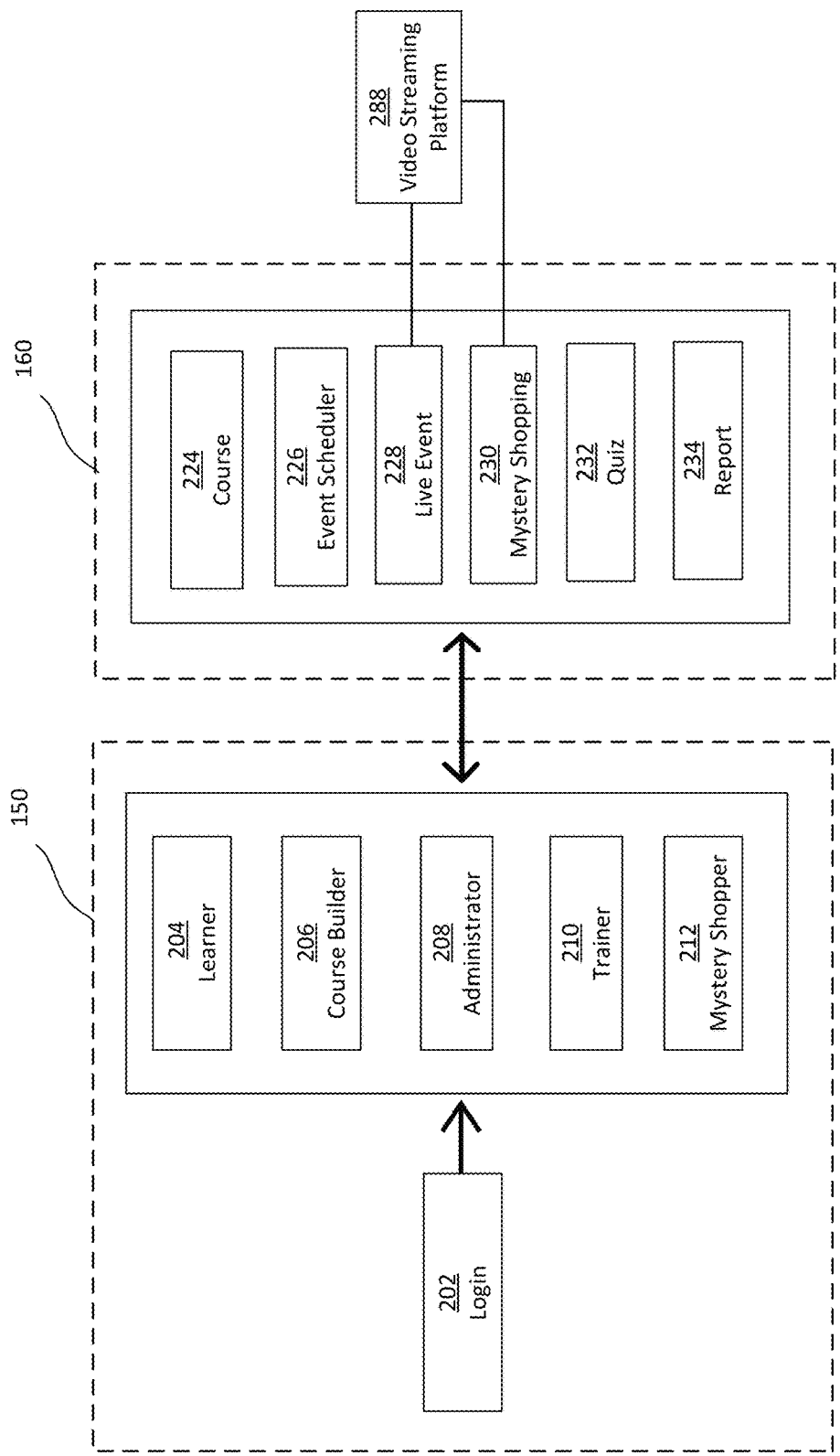
FIG. 2 shows a block diagram of exemplary systems, components, modules and/or functionalities implemented in the system of FIG. 1.

In one implementation, the backend system 104 includes a first resource management system 150, as further described in conjunction with FIG. 2. The first resource management system is, for example, a content management system (CMS), such as a web content management system. The CMS 150 may be implemented using server computer 140 to administer a user account registry and to store learning objects and/or other types of digital content on one or more content repository residing on one or more computer-readable data stores. Implementing a CMS using other suitable computing device, or group of computing devices, having data processing and communication capabilities may also be useful. In one implementation, the system 100 requires users 180 to have a registered user account with the CMS for accessing information and learning objects stored within the system 100 through one or more client devices associated with the user 180. A user account maintained at the CMS 150 may include identification information about the user 180, as well as information related to the user's role or predefined function in the system 100. The CMS can implement access control functions to differentiate between different types of users 180 in the system 100. For example, the CMS 102 may grant users 180 role dependent access to resources and functionalities in the system 100. The client device 110 can communicate with CMS to perform various functions, including storing learning objects and/or accessing learning objects in various storage locations of the system 100. As used herein, the term "storage location" refers to a location where learning objects are stored and may include content repositories, data stores, or other storage structure element in which digital content is stored.

In one implementation, the backend system 104 of the learning platform includes a second resource management system 160 utilized in conjunction with the first resource management system 150, as further described in conjunction with FIG. 2. The second resource management system is, for example, a learning management system (LMS) 160 implemented using server computer 140. Implementing a LMS using other suitable computing device, or group of computing devices, having data processing and communication capabilities may also be useful. In one implementation, the LMS implements functions that facilitate management of a registered user's learning activities in the system 100. For example, the LMS 160 can facilitate the process of delivering learning objects and/or invitation to learning activities to one or more registered users 180, tracking users' learning progress, and receiving user's completed work product including online tests and quizzes. The LMS may track user's learning progress using any suitable standards, including "Tin Can" Application Programming Interface (API) protocol, and Sharable Content Object Reference Model (SCORM) protocol.

FIG. 2 shows a block diagram of exemplary systems, components, modules and/or functionalities implemented in the backend system 104 of the learning platform. For example, the backend system 104 includes a CMS 150 and a LMS 160 utilized in conjunction with the CMS 150, as described with respect to FIG. 1. Additional systems may also be utilized in conjunction with the CMS or LMS. Each of these systems, components, modules and/or functionalities can be provided in the form of computer instructions that are executed by a processor or computer, such as the one or more server computers 140 in the backend system 104.

The CMS 150 is operable to provide a network accessible interface by which users can access learning objects stored in learning content repository residing on data stores of a server computer 140. In one implementation, each user 180 can have a registered user account with the CMS 150 for controlled access to information, modules, digital content (e.g., learning objects) and functionalities (e.g., learning activities) associated with the system 100. For example, the CMS 150 allows the user 180 to register a user account with the CMS for accessing information and learning objects stored in the backend system 104 through one or more client devices 110 associated with the user account via the interface module 118 displayed in the context of an App 102 at the client device 110. For example, the CMS 150 can provide registered users 180 with controlled access to interact with learning objects stored in the learning content repository through the one or more client devices 110. The CMS 150 may communicate with client device 110 to obtain information for the user account, which can be an account that a user 180 establishes with the user account registry in the CMS 150 to create, delete, store, move or modify learning objects in various storage locations within the system 100.

In one implementation, the client device 110 can establish a login session with the CMS 150 by logging into a registered user account via the App 102 running on client device 110. For example, a user 180 can log in to the user account by entering login credentials such as a username and a password into a login module 202 output for display on the client device 110. Entering the login credentials can cause client device 110 to establish a connection with the CMS 150 to verify the credentials and initiate a login session. In one implementation, the login session is a persistent login session. Alternatively, the login session can terminate when the user 180 logs out or when the user closes the mobile app.

The CMS 150 can store and manage various types of digital data (e.g., digital content, metadata). Some of the digital data stored and managed by the CMS 150 can include access control information associated with one or more registered user 180 accounts. Examples of registrable user accounts include learner accounts 204, course builder accounts 206, administrator accounts 208, trainer accounts 210, and mystery shopper accounts 212.

The learner accounts 204 are each associated with a particular type of user 180 who is enrolled into one or more courses (e.g., course of study, training program etc.) implemented within the system 100. Users 180 associated to learner accounts may be referred to as "learners". A learner's access to interact with the system 100 may be course-dependent. For example, learners may only view or retrieve learning objects, and participate in learning activities (e.g., live events, online quizzes), which are related to the one or more courses associated with the particular learner.

The course builder accounts 206 are each associated with a particular type of user 180 who is designated to create (e.g., design and build) one or more courses implemented within the system 100. A course may be built by creating a sequence of course segments corresponding to a predetermined course structure. Users 180 associated to course builder accounts may be referred to as "course builders". Course builders may be given access to create and store learning objects associated with the courses implemented within the system 100.

The administrator accounts 208 are each associated with a particular type of user 180 who is designated to monitor and administer the services and functionalities of the system 100 through a computer or computing device. Users 180 associated to administrator accounts may be referred to as "administrator". An administrator may be given authority to perform a range of administrative functions in the system 100 such as, but not limited to, creating learner accounts for association with particular users 180; adding (or enrolling) learners to, and removing learners from, one or more courses implemented in the system 100; assigning learning activities to learners; and generating performance-related reports of one or more learners.

It is to be appreciated that the CMS 150 can also be configured to provide for registration of super administrator accounts that are each associated with a particular type of user 180 (hereinafter "super administrator") who is conferred elevated authority to perform a wider range of administrative functions in the system 100 relative to users 180 associated with the administrator accounts 208. For example, a super administrator may be given authority to perform exclusive administrative functions such as, but not limited to, creating administrator accounts for users 180 designated as administrators, in addition to performing the range of administrative functions associated to an administrator.

The trainer accounts 210 are each associated with a particular type of user 180 who is assigned to teach one or more courses implemented in the system 100. Users 180 associated to trainer accounts may be referred to as "trainers". A trainer may be conferred authority to conduct (or host) one or more learning activities (e.g., live event, online quizzes). For example, a trainer can host a scheduled live event, which is broadcast in real-time (or near real-time) to client devices 110 associated with one or more learners 204.

The mystery shopper accounts 212 are each associated with a particular type of user 180 who is assigned to observe or evaluate the performance of one or more performers during a mystery shopping event. As used herein, the term "performer" refers to one or more human, who may or may not be an user 180 of the system 100. Users 180 associated to mystery shopper accounts may be referred to as "mystery shoppers". A mystery shopper may be conferred exclusive authority to conduct (or host) a particular type of live event (e.g., live mystery shopping event); create a recording of the live event; and generate a performance-related report in the context of the live event. For example, a mystery shopper can host and record a live mystery shopping event, which is broadcast in real-time (or near real-time) to client devices 110 associated with one or more particular types of users 180 (e.g., learners, trainers) in the system 100.

It is to be appreciated that other types of user account and digital data can also be configured at the CMS 150, depending on operation requirements. For example, a single registered user account in the CMS 150 may be designated with multiple roles such as, but not limited to, trainer and mystery shopper roles.

As briefly mentioned, the backend system includes an LMS 160 utilized in conjunction with the CMS 150. In one implementation, the LMS 160 includes modules for performing various functions within the system 100 including, but not limited to, creating and managing courses and learning objects, scheduling live events, broadcasting and/or recording live events, administrating assessment activities (e.g., online quizzes and/or other assignments), and tracking each learner's activities in the system 100 and collate results of each learner's performances in assessment activities. In one exemplary implementation, the LMS 160 includes modules such as, but not limited to, a course module 224, an event scheduler module 226, a live event module 228, a quiz module 230, a mystery shopping module 232, and a report module 234.

The course module 224 facilitates implementation, delivery and management of a catalogue of courses (e.g., educational programs, training programs) maintained in the system 100. Each course includes one or more course segments and a collection of information and learning objects relating to one or more courses. The courses may be created by a course builder who is associated with one of the course builder accounts 206. Course builders can utilize the course module 224 to create and store information associated with a particular course, such as a course identifier (e.g., course name, course code), a course description, course structure (e.g., course format, organization of course segments), and links to the course-related learning objects. The learning objects may be in the form of text documents, video files, digital images, or the like. In one implementation, learners may receive notification of new information (relating to the courses in which the learners are enrolled) made available in the system 100. For example, when new learning objects relating to Course A, or a course segment of Course A, are created and stored in the learning content repository, electronic notifications are delivered online from the backend system 104 to the frontend system 102 on the client device 110 associated to learners enrolled into Course A. For example, learners not associated to Course A may not receive any notification of the new learning objects relating to Course A. The notification may be automatically delivered to the frontend system 102 in the form of in-application (in-app) notification and/or push notification.

In one implementation, learners may enroll into a course by selecting a course from the catalogue of courses maintained in the courses module 224 and associating their respective learner account 204 with the course, such as by entering into their respective learner account 204 a course code that identifies the course. In an alternative implementation, an administrator who is associated with one of the administrator account 208 may selectively associate one or more learner accounts 204 with one or more courses in the system 100. For example, an administrator can utilize user-related information to identify learner accounts 204 associated to learners who are to be enrolled into one or more courses maintained in the courses module 224. Information that can be utilized to identify the learner accounts 204 includes names, usernames, user profile, email addresses, and the like. For example, information identifying the learners for one or more courses may be retrieved, such as by digital data transmission over a network, from a data source such as a server computer in the backend system 104, by an administrator. In yet another implementation, the CMS 150 can use information from learner accounts 204 of a plurality of learners to associate any of the plurality of learners with a course maintained in the course module 224. For example, users 180 of the system 100 may include a plurality of learners that may be associated with each other in some way (e.g., co-workers), or may not be specifically associated with each other beyond having learner accounts 204 maintained in the CMS 150.

In one implementation, the LMS 160 can store the collections of information and learning objects relating to a course in the CMS 150, and cause those information and learning objects to be opened for editing at the LMS 160. For example, existing courses and course-related learning objects can be archived or copied from the course module 224 into the learning content repository managed by the CMS 150 for storage and retrieval. In one implementation, the collections of information and learning objects stored in the CMS 150 can be used as templates for creating other courses maintained in the LMS 160. For example, a new course can be built and maintained in the course module 224 by copying and/or modifying previous courses or course segments, and one or more learning objects associated with the previous course may also be associated with the new course.

In one implementation, the LMS 160 includes an event scheduler module 226. The event scheduler module facilitates the management of course-related interactive live events that are scheduled for different instances of time to be broadcast to the client device 110. For example, the live events may be upcoming virtual events such as live-stream classes, lectures, seminars, tutorials, workshop, mystery shopping, and the like, conducted in a virtual setting for users 180 in the system 100 to attend the live event remotely. The event scheduler module 226 can provide information regarding each scheduled live event and the one or more courses that are associated with each scheduled live event including, but not limited to, event name, event description, course identifier, course segment identifier, and learning objects that are related to each live event. The event scheduler module 226 allows designated users 180 such as administrators and mystery shoppers, to schedule upcoming live events and selectively assign learners with access to attend the scheduled live events. In one implementation, learners may receive notification of an invitation to attend a scheduled live event related to the respective courses in which the learners are enrolled. For example, when learners are assigned access to a scheduled live event, electronic invitations to attend the particular live event are delivered online from the backend system 104 to the frontend system 102 on client devices 110 associated to the learners. The invitations may be automatically delivered to client devices 110 in the form of in-application (in-app) notification and/or push notification.

In one implementation, the event scheduler module 226 includes a data matching module for searching and identifying learners who are enrolled in courses related to respective scheduled live events maintained in the event scheduler module. For example, the data matching module utilizes information (e.g., metadata) stored in the CMS 150 to match a particular scheduled live event to learners associated with a course related to the particular scheduled live event. The data matching module may perform matches based on a set of predefined rules which processes information in the CMS 150 and LMS 160 including the predefined course identifier and/or course segment identifier for the particular scheduled live event, and the one or more courses associated with a learner account. Such rules define the circumstances under which a learner is assigned (or invited) to attend a scheduled live event. For example, data matching module may utilize a set of matching rules relating to matching a learner account associated with a course identifier (e.g., course code) and a schedule live event having a same course identifier as the learner account. The data matching module can automatically deliver invitations to the learner accounts matched with the particular scheduled live event. The invitation can include in-app options (presented by the interface module 118 as native interface elements) such as an "Interested" option, an "Attending" option, and a "Not attending" option, for recipients (e.g., learners) to either register an interest in attending the scheduled live event, or provide an indication of their attendance status (e.g., attending, not attending) for the scheduled live event.

The data matching module may be invoked in real time by another process (e.g., the event scheduler module 226 may invoke the data matching module when a live event is scheduled), or it may be invoked manually by an authorized user 180 (e.g., administrator). Upon invocation, the data matching module processes the information stored in the CMS 150 to match a scheduled live event in the LMS 160 with any learner accounts associated to one or more courses relating to the particular scheduled live event. Thereafter, a learner who receives an invitation to attend the scheduled live event may utilize in-app options to register an interest in attending the scheduled live event, or provide a confirmation of their attendance status for the scheduled live event.

In one implementation, the event scheduler module 226 includes a reminder module to deliver in-app reminder notifications (hereinafter "reminders") to learners who are attending an upcoming scheduled live event. The reminders are delivered online from the backend system 104 to the frontend system 102. In one implementation, learners who registered an interest in attending one or more scheduled live events may receive reminders to confirm their attendance status for the particular scheduled live event. In another implementation, learners who confirmed their attendance for one or more scheduled live events may receive timely event reminders in advance of each corresponding scheduled live event. In yet another implementation, learners who confirmed their absence from one or more scheduled live events may not receive any reminders for the corresponding schedule live events. The reminder module may deliver event reminders to learners through their respective client devices 110 in the form of in-app notifications and/or push notifications. The reminder module may deliver reminders to learners within predefined timeframes prior to the scheduled live event.

In one implementation, the LMS 160 includes a live event module 228. The live event module may provide all or part of a scheduled live event maintained in the event scheduler module to the client devices 110 in the system 100. In one implementation, the live event module 228 provides a video data stream (hereinafter "stream") of a scheduled live event to an internet-based video streaming platform (e.g., wowza) 288 for broadcasting in real-time. The scheduled live event is associated to a course implemented in the system 100 and may be a live workshop. For example, the video streaming platform broadcasts a stream of the live workshop in real-time to client devices 110 associated to learners attending the live workshop. Learners may view a stream of the live workshop on the screen of their client devices. Learners viewing a stream of a live event may be referred to as "viewers".

A live event may be conducted (or hosted) by at least one performer. In one implementation, an educational performance by the performer is presented during the live event. The performer is, for example, a trainer assigned to teach a course associated to the live event. For example, a client device 110 associated to a trainer, who is conducting (or hosting) a live event (e.g., live workshop), includes resources such as camera and microphone for capturing a stream of the trainer's performance (e.g., presentation, demonstration, lecture). The trainer-associated client device 110 provides a stream of the trainer's performance for broadcasting in real-time to viewer-associated client devices 110 via the video streaming platform 288. The client device 110 can present the live event to viewers (e.g., learners) via the media player module 114 in the frontend system 102. The video streaming platform may be implemented on streaming servers.

In one implementation, the video streaming platform 288 may facilitate capturing a stream of the live event (e.g., live workshop) to create a video recording of the trainer's performance and store the video recording as a learning object in the learning content repository of the CMS 150. A video recording may be stored in the form of a video file. For example, a video file containing a video recording of the trainer's performance during a live workshop can be stored as a learning object in the system 100. A video file can include information about a particular video recording such as, but not limited to, audio and visual data captured from a stream of the live event, a video identification, an event identification, length of the video replay, and the like. For example, learners enrolled into Course A may access the system 100 at a later time after the end of a broadcast of a first live workshop, which is associated to Course A and conducted by Trainer A who is assigned to teach Course A, to locate a video file generated from a stream of the first live workshop and playback a video recording of Trainer A's performance (e.g., presentation, demonstration, lecture) for self-learning or self-revision.

The live event module 228 can facilitate in-app connection between multiple client devices 110 such that multiple viewers can interact with each other through the live event module during a stream of the live event. For example, the live event module 228 allows the LMS 160 to serve as an event host or server to which one or more client devices 110 can connect. Client devices 110 may connect to the live event module 228 via registered user accounts maintained in the CMS 150. In one implementation, the live event module 228 includes a messaging module to facilitate communication between a performer (e.g., trainer) conducting a live event and viewers attending the particular live event. The messaging module, for example, can directly receive messages from client device 110 of viewers attending the live event, and trainer messages from client device 110 of the trainer conducting the live event. Messages received at the messaging module are simultaneously presented on the screen of client devices of the trainer and viewers.

In one implementation, the messaging module can assimilate messages (e.g., viewer and/or trainer messages) received from multiple client devices 110 into a message stream. The messaging module can directly output messages from the message stream for display on a screen of the client device 110. The messaging module can also create computer instructions for how and when to present messages. The computer instructions can be metadata that indicates when to present a message, a presentation order, a presentation sequence number and the like. The messaging module can also include computer instructions to present a message according to its timestamp (the particular instance of time the message was received at the messaging module). The messaging module can present messages from the message stream to client devices 110 via a messaging interface incorporated within the interface module 118 in the frontend system 102, as described in conjunction with FIG. 3c. The messaging module can use computer instructions to ensure synchronization of messages presented on the client device 110. For example, the message stream is implemented using a message queue, where the messaging module sorts each message and sends the messages to the client device 110 to be presented according to the order in which the messaging module sorted the messages.

The messaging module can store messages received from client device 110 during a live event as message records in the learning content repository managed by the CMS 150. The learning content repository may include any number of message records. A message record can include any number of messages and information about each message, including the content of the message itself. For example, the message record can include message identification, a time the message was received, a user account identification associated with the sender of the message, an event identification, and the like. In one implementation, multiple messages (e.g., viewer and/or trainer message) from client devices 110 associated to different users 180 are entered into the message stream via the message interface in the frontend system 102. The client device 110 transmits the messages, along with information about each message (as described above), to the messaging module via network 108. The messaging module can assimilate the messages and cause the messages to be stored as a message record on the learning content repository. The messaging module can also receive and present the messages on a screen of client device 110 via the message interface in real-time during a live event. After a broadcast of a live event ends, the message record is integrated and synchronized with a video file of the live event stored in the learning content repository to create a digital representation of the live event. For example, the messaging module utilizes information (e.g., event identifier) in the message record to match or identify a video file of a particular live event for integration and synchronization such that the video file is modified to include a replay of the messages presented from the message stream in chronological order. For example, a digital representation of the live event includes a playback of a video recording of the particular live event and a replay of the message stream as it was presented at different instances of time during the particular live event.

In one implementation, the LMS 160 includes a mystery shopping module 230. The mystery shopping module 230 facilitates collection and reporting of performance-related data from a location (hereinafter "site") at which one or more performances of interest take place. A site can be a front line service environment (e.g., customer contact point) of a business or organization. A performance of interest at a site, which can be physical or virtual, can include any interpersonal interaction involving at least one human being associated with the site, such as a front line staff, and at least one human being (e.g., mystery shopper) not associated with the site, which may be observed or experienced, reviewed, reflected upon and/or evaluated. In one implementation, the human being associated with the site is a performer engaged in a performance of interest, and the human being not associated with the site is a mystery shopper interacting with the performer to observe and evaluate the performer's performance. The performer and the mystery shopper may be physically co-located at a particular site while interacting with each other, or may be interacting virtually over the internet at a single virtual site. A physical site includes, for example, a financial center, a retail store, a restaurant, a government office, and the like. A virtual site includes, for example, a virtual space where virtual avatars of the performer and the mystery shopper may interact in what may be viewed as a performance of interest, or where two individuals (e.g., performer and mystery shopper) who are not co-located may engage in a computer-assisted real-time exchange in what may be viewed as performance of interest.

Similar to the live event module, the mystery shopping module 230 may provide all or part of an interactive live event to the client devices 110 in the system 100. In one implementation, the mystery shopping module 230 provides a stream of a live mystery shopping event (interpersonal interaction between a performer and a mystery shopper) to the video streaming platform 288. In one implementation, the video streaming platform broadcasts a stream of the live mystery shopping event in real-time to client devices 110 associated to users 180 (or viewers) attending the live mystery shopping event. The video streaming platform 288 may facilitate generating and storing a video recording of the live mystery shopping event in the learning content repository of the CMS 150. For example, a video recording of the performer's performance during a live mystery shopping event is stored in the form of video file for use as a learning object in the system 100 and/or for further evaluation of the performer's performance of interest at a later time. A performer may eventually receive feedback on their performance through a review process of the broadcast or video recording.

In one implementation, the live mystery shopping event is conducted (or hosted) by a mystery shopper for characterizing the salient aspects of an interpersonal interaction between the mystery shopper and a performer (e.g., frontline staff of a retail store). For example, a mystery shopper who is conducting the live mystery shopping event can broadcast the live mystery shopping event to client devices 110 in real-time (or near real-time) for viewers to rate the performer's performance at different instances of time during a stream of the live mystery shopping event. The client device 110 can present a stream of the live mystery shopping event to viewers (e.g., learners) via the media player module 114 in the frontend system 102.

In one implementation, the LMS 160 includes a quiz module 232. The quiz module 232 facilitates the assessment of a learner's progress at the end of a learning activity, including a live event. For example, course builders can utilize the quiz module 232 to create, distribute, grade, and/or return quizzes (short assessments that gauge a learner's retention and comprehension of a topic) during or after a live event. Quizzes are created by course builders providing collections of documents relating to a course in the system 100, or created using a predefined template document stored in the CMS 150. Creation of a quiz can include receiving, at the LMS, information such as a quiz title, quiz description, quiz instructions, quiz questions, a completion timeline, or information identifying the quiz as being related to a course (e.g., course identifier) or course segment (e.g., course segment identifier), and the like.

In one implementation, a course builder can create a quiz by storing a document in the CMS 150, and designating the document as being a template document that learners will use to complete the quiz. In order to allow the learners to complete the quiz, a copy of the template document will be made for each learner that is enrolled in the course, and the copy can be open for editing at the LMS 160 via the quiz module 232. The copy for each learner can be made at the time that the learner accesses the template document. Access control information for each copy may designate each learner as an owner of a respective copy of the document, and optionally designate users 180 not associated to a learner account (e.g., trainer, administrator) as being authorized to access and view each copy of the document. The learners complete the quiz by opening the document and editing the document to present their answers to each question in the document.

In one implementation, the quiz module 232 includes a marking module, which facilitates grading of quizzes completed by learners. For example, a course builder can create and assign an answer key to the questions in the template document that learners used to complete the quiz. When the learner is finished with a quiz, an interface element, such as a "submit" button is operated by the learner. The "submit" button can be incorporated in an interface screen for the quiz module, and can be displayed as part of the interface screen for the quiz module 232. After the "submit" button is operated, the access control information for the document is modified such that the learner is no longer able to modify the document, and the document is submitted for grading by the marking module. The marking module automatically marks the submitted document by, for example, comparing the learner's answers for each question with the predefined answer key. Once the submitted document is marked, the marking module automatically generates the grading information of the submitted document and returns the graded document to the learner. The process of marking and returning the documents to learners is executed instantaneously (or near instantaneous). The quiz module 232 can provide information to the LMS 160 regarding, for example, which learners have accessed the document, the length of time of access, whether each learner has completed the quiz, and the grading information of each learner in relation to the quiz.

In one implementation, the LMS 160 includes a report module 234. The report module monitors, logs and generates a report of the activities of learners in the system 100. For example, learning and/or assessment activities (e.g., quizzes and live event participation) are monitored, recorded and stored in a format that allows subsequent searching, querying and retrieval. Data mining processes and analysis processes may be performed on the tracked and logged operations that learners perform in the system 100. The data mining and analysis may determine conclusions with regard to the performance, the achievements, the strengths, the weaknesses, the behavior and/or other properties of one or more learners.

The report module 234 may generate reports at various times and using various methods, for example, based on the choice of the administrator. Reports may be generated, for example, at the end of a course; at the end of each course segment; at particular times (e.g., at a predefined day of each month); upon demand, request or command of a particular user (e.g., administrator); upon a triggering event or when one or more conditions are met (e.g., upon completion of a quiz by a learner or group of learners). The generated reports are used to assess learner performance, learner knowledge, learner attendance record in the context of assigned live events, learner behavior during live events (e.g., number and content of messages entered during a stream of the live event), or other learner parameters. In one implementation, the report module 234 is capable of generating and/or updating a progress report of a learner, a group of learners, learners associated with a course, learners associated with each other in some way, or the like. For example, the report module 234 may perform data mining and analysis processes on quiz results stored in the learning content repository to generate and/or update the progress report associated with Learner A, indicating the proficiency of Learner A in a particular course segment or course. In another example, the reports module may perform data mining and analysis processes on message records associated with Learner A to determine Learner A's level of participation during one or more live events. In yet another example, the reports module 234 may perform data mining and analysis processes on learner accounts 204, or event scheduler module 226, to monitor Learner A's frequency of attendance in live events and the duration of attendance in each of the attended live events (e.g., to determine whether Learner A attended the live event from start to finish).

FIGS. 3a-3d show exemplary illustrations of an interface screen 300 that can be output for display on the screen of the client device 110 through the interface module 118 during some implementations of the system 100 described in FIGS. 1-2. The client device 110 is, for example, associated with a learner enrolled into one or more courses implemented within the system 100. A learner logs into a registered learner account via the frontend system 102 running on client device 110 to access information, learning objects and functionalities within the system 100.

Figure 3A:
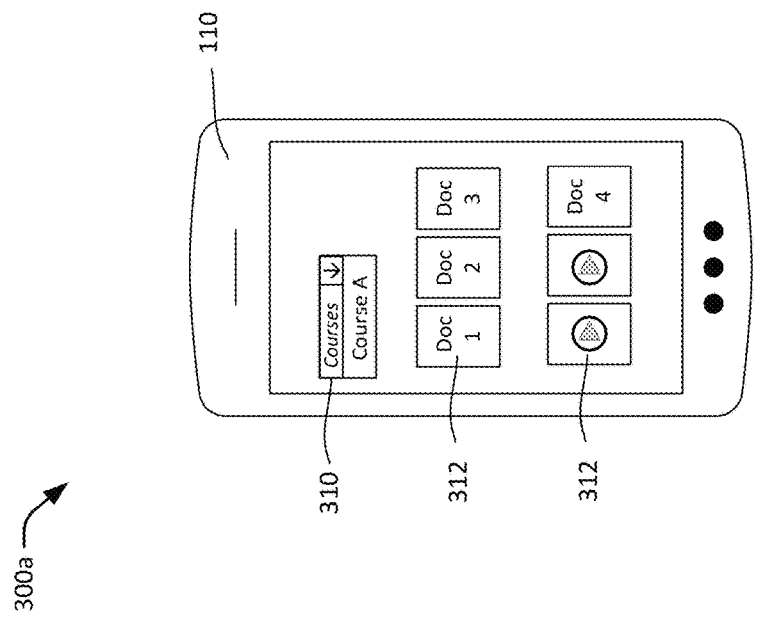

FIG. 3a shows an exemplary illustration of an interface screen 300a that can be output for display through the interface module 118 for interfacing with the course module 224 of the LMS 160. The interface screen 300a includes a native interface element 310 for selecting a course associated with the learner. The interface element 310 is, for example, a drop-down menu listing one or more courses that the learner is enrolled in, while courses not associated with the learner will not be listed for selection in the drop-down menu 310. Each course can be represented by a course identifier (e.g., course title or course code) within the drop-down menu 310 for selection by the learner. The drop-down menu 310 may be configured to access one or more predefined data storage locations in the system 100 (e.g., learning content repository in the CMS 150) for displaying information and learning objects associated with a particular course (e.g., Course A) selected from the drop-down menu 310.

Once the learner operates the drop-down menu 310 and selects a course from the drop-down menu 310, the interface screen 300a displays native interface elements 312 for accessing learning objects, such as documents and video files, associated to the course selected from the drop-down menu 310. The interface elements 312 can be displayed in the form of digital images for selection by the learner and may include learning object identifiers (e.g., learning object name, digital file type) to differentiate between different types of learning objects, such as text documents and video files, and to describe the content within each learning object. In one implementation, the course module 224 determines which learning objects are presented to the learner using access control information that is associated with each learning object. The interface screen 300a, for example, only presents learning objects 312 that the learner is authorized to access. The learner can be authorized to browse and select one or more learning object 312 if, based on the access control information, the learning object is shared with the learner by the system 100 and/or an administrator. For example, a learner may be authorized to browse all or a predetermined selection of learning objects associated to a particular course (e.g., Course A) selected from the drop-down menu 310.

FIG. 3b shows an exemplary illustration of an interface screen 300b that can be output for display through the interface module 118 for interfacing with the event scheduler module 226 of the LMS 160. The interface screen 300b includes an events feed 320 that outputs (or posts) information regarding upcoming scheduled live events for display to learners. The events feed 320 can present multiple posts that each include information regarding a respective scheduled live event. For example, each post can include information identifying the course and/or course segment associated with the live event (e.g., live workshop, live mystery shopping event), information identifying the trainer conducting the live event, information giving instructions in relation to the live event, a scheduled date and time for broadcasting the live event, and an attendance status indicator that indicates whether the learner associated to the client device 110 is attending the scheduled live event. Objects can be embedded in one or more post in the events feed 320. These objects can include, for example, images relating to the particular live event (e.g., digital photo of the trainer conducting the live event); or links to learning objects (e.g., documents, video files) relating to the particular live event. Each post can include interface elements 322, 324 and 326 that allow learners to enter into the system 100 their attendance status for a scheduled live event. For example, a learner can operate (or select) the "Interested" interface element 322 to register an interest in attending the scheduled live event 322; operate the "Attending" interface element 324 to register a positive confirmation of their attendance for the scheduled live event; or operate the "Not attending" interface element 326 to register their absence from the scheduled live event.

The event scheduler module 230 includes access control information specified by the system 100 and/or an administrator. In one implementation, access control information specified by the system 100 can cause a learner's events feed 320 to selectively post scheduled live events relating to one or more courses associated with the particular learner, while scheduled live events not relating to any course associated with the particular learner will not be posted on the learner's events feed 320. For example, learners can only view posts of upcoming live events relating to the one or more course (e.g., Course A) they enrolled in. In one implementation, an administrator can selectively modify the access control system specified by the system 100 such that one or more scheduled live events not relating to any course associated with the particular learner are posted on the learner's events feed 320. For example, an administrator can selectively assign any scheduled live event, including live mystery shopping events, for display on the events feed 320 of one or more particular learners.

Although FIG. 3b illustrates scheduled live training events presented on the events feed 320, it is to be appreciated that the event scheduler module 226 can output for display any type of scheduled live events, including upcoming live mystery shopping events, depending on the access control information associated with the particular live event. In the case of a scheduled live mystery shopping event, the events feed 320 may outputs (or posts) limited information regarding an upcoming scheduled live mystery events to protect the integrity of the mystery shopping event. For example, posts relating to live mystery events may only include information giving instructions in relation to the live mystery event, a scheduled date and time for broadcasting the live event, and an attendance status indicator that indicates whether the learner associated to the client device 110 is attending the scheduled live event.

Figure 3C:
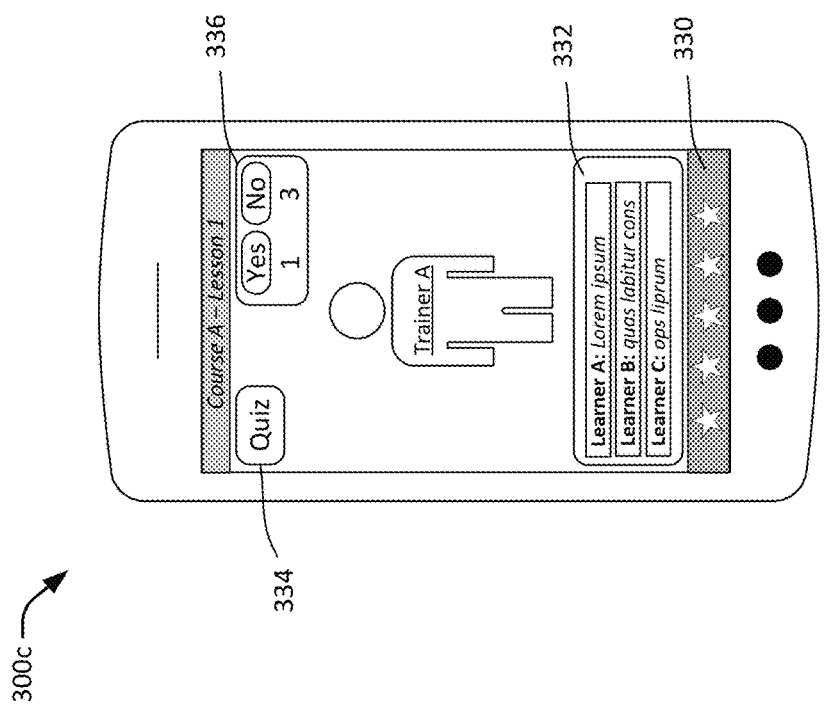

FIG. 3c shows an exemplary illustration of an interface screen 300c that can be output for display through the interface module 118 for interfacing with the live event module 228 of the LMS 160. For example, the live event module 228 presents a stream of a live event on the interface screen 300c of each client device 110 of a plurality of learners attending the live event remotely. In the interface screen 300c, a trainer (e.g., Trainer A) is conducting a live workshop and broadcasting the live workshop to a plurality of learners who are in remote attendance. The live workshop is associated with a course that the learners are enrolled in. The trainer broadcasts the live workshop to learners attending the live workshop to communicate information regarding the particular course, or course segment of the particular course. In one implementation, the trainer broadcasts the live workshop using a client device 110 associated with the trainer. The client device 110 may be a mobile computing device (e.g., smart phone, laptop) having native features, such as a camera and microphone, to generate audio and visual data of the live workshop for broadcasting in real-time. For example, when the App is running, the control module 112 may be configured to cause the camera and microphone to operate, providing a stream of the trainer's performance (e.g., demonstration, presentation) during the live workshop for broadcasting to learners (or viewers) in real-time. A stream of the live event can be captured (or recorded) to generate a video file of the live event for storing in the learning content repository, as described in FIG. 2.

A stream of the live event may be presented on the screen via the media player module 114. The media player module 114 includes a display of the trainer conducting the live event in real-time (or near real-time). The interface module 118 may be configured to provide one or more interface elements overlaying the media player module 114 to interface with the live event module 228. For example, learners attending a live workshop may view a stream of the live workshop through the media player module 114 and simultaneously operate one or more interface elements overlaying the media player module 114, as shown in FIG. 3c.

In one implementation, the interface screen 300c includes a real-time rating interface 330. The real-time rating interface 330 is an interface element provided for rating the performance of the trainer (e.g., Trainer A) during a stream of the live event. Learners can operate the real-time rating interface 330 once at any instance of time prior to the end of the live event. The real-time rating interface 330 is, for example, utilized by learners (or viewers) in remote attendance to provide feedback on the trainer's performance (e.g., teaching competency) and/or the quality of live event. As an exemplary illustration, the real-time rating interface 330 may include a unipolar five-point rating scale for rating the trainer's performance. The real-time rating interface 330 can be configured to display on the screen of client device 110 associated to the trainer and/or the viewers (learners in remote attendance), an average rating value calculated from the scale points enter by viewers of the live event. In one implementation, viewers can operate the real-time rating interface 330 at any instance of time during the live event to enter a scale point between 1 point to 5 points (e.g., 1 star-5 stars), including 1 point and 5 points. Prior to the end of the live event, viewers can repeatedly replace (or modify) the previously entered scale point by operating the real-time rating interface 330 to enter a new scale point until a predetermined timeframe prior to the end of the live event. For example, the real-time rating interface 330 repeatedly calculates and updates the average rating value on display based on the newest scale points enter by viewers of the live event.

Providing a real-time rating interface 330 allows viewers (e.g., learners in remote attendance) a means of appraising the effectiveness of a trainer's teaching performance (e.g., teaching competency) in a particular live event, and encourages trainers to improve on unsatisfactory performance levels during a live event or in subsequent live events. For example, a trainer can choose to change pedagogic approaches during a live training event upon receiving less than satisfactory average rating values. For example, satisfactory average rating values serve to validate a trainer's choice of pedagogic approach.

In one implementation, the interface screen 300c includes a messaging interface 332. The messaging interface 332 is an interface element provided for viewers to interface with the messaging module of the live event module 228 during a stream of the live event. Learners attending the live event remotely can operate the messaging interface 332 to communicate with the trainer (e.g., Trainer A), and with other learners in remote attendance, by text messages. In one implementation, learners can operate the messaging interface 332 to enter one or more messages for display on the messaging interface 332. For example, messages are entered into a message stream via the messaging interface 332 and the messages are presented in chronological order, as described in FIG. 2. The messaging interface 332 can display messages from the message stream in real-time (or near real-time) to the viewers during a stream of the live event and can also display information identifying the sender of each message.

In one implementation, the interface screen 300c includes a quiz interface 334. The quiz interface 334 is an interface element provided for viewers to interface with the quiz module 230 of the LMS 160 during a stream of the live event. Viewers may operate the quiz interface 334 to access a quiz document associated to the particular live training event, as described in conjunction to FIG. 2.

In one implementation, the interface screen 300c includes a live poll interface 336. The live poll interface 336 is an interface element provided for trainers to conduct one or more live polls during a stream of the live event. As an exemplary illustration, the interface element 336 can display Yes/No polling options for viewers to provide answers to a trainer's question during a stream of the live event. It is understood that the live poll interface 336 can also be configured to display other types of polling options including numbered options and true/false options. The live poll interface 336 can display an aggregate number of times each polling option was selected during the live event. For example, a numerical value can be displayed below each polling option to represent the number of times the corresponding polling option was selected by viewers. A trainer can spontaneously conduct a live poll during a stream of the live event in the context of one or more closed-ended questions directed to the viewers to assess viewers' understanding of a course-related concept or topic.

Figure 3D:
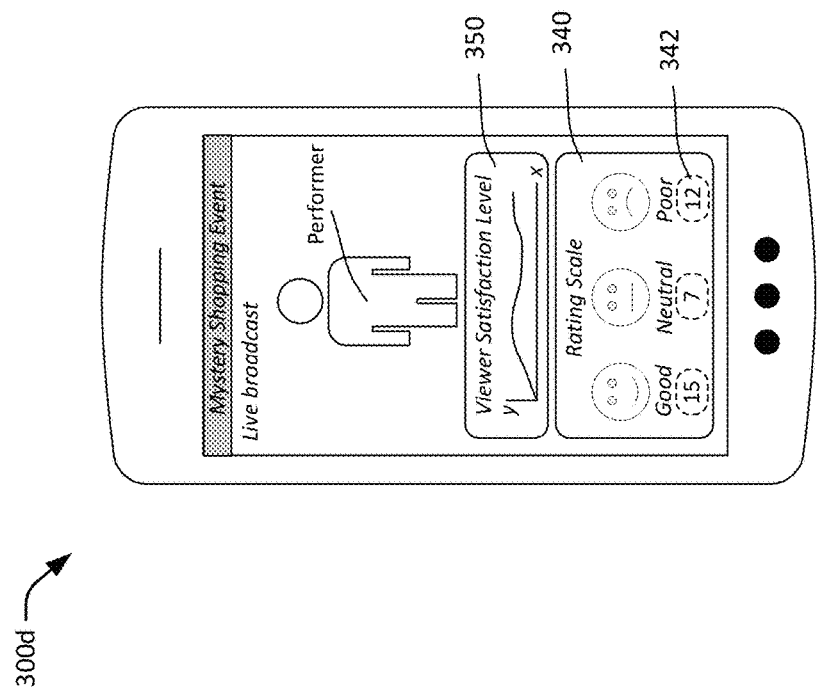

FIG. 3d shows an exemplary illustration of an interface screen 300d that can be output for display through the interface module 118 for interfacing with the mystery shopping module 230 of the LMS 160. For example, the mystery shopping module 230 presents a stream of a live event on the interface screen 300d of each client device 110 of a plurality of viewers (e.g., learners attending the live event remotely). In the interface screen 300d, a client device 110 (e.g., smart phone) associated with a mystery shopper is discreetly used to provide a stream a live mystery shopping event for broadcasting in real-time. For example, at least one mystery shopper (not shown) is conducting a live mystery shopping event to observe the performance of a performer at a predetermined site. The client device 110 of the mystery shopper may send a stream of the live mystery shopping event to the streaming platform 288 for broadcasting to a plurality of learners who are in remote attendance. The client device 110 may be a smart phone having native features such as a camera and microphone. For example, when the App is running, the control module 112 may be configured to cause the camera and microphone to operate, generating audio and visual data of the live mystery shopping event for broadcasting to viewers in real-time (or near real-time).

In one implementation, the stream of the live mystery shopping event may include an image and audio feed of the performer, and an audio feed of the mystery shopper, while an image feed of the mystery shopper is not included. For example, the mystery shopper is discreetly directing the camera on the client device at the performer to provide a stream of the performer's performance. Although only one mystery shopper is described, it is appreciated that the live mystery shopping event may include more than one mystery shopper. In an alternative implementation, the live mystery shopping event may include an image and audio feed of the performer and a first mystery shopper. For example, a second mystery shopper is discreetly directing the camera on the client device at the performer and first mystery shopper to provide a stream of the performer's performance. A stream of the live mystery event can be captured to generate a video file of the live mystery shopping event for storing in the learning content repository, as similar described in FIG. 2 with respect to the live event module 228.

In one implementation, the mystery shopper conducts the live mystery shopping event to evaluate the performance of one or more performers (e.g., front line staff, service staff). The performer may or may not be associated with a user account maintained in the system 100. A stream of the performer's performance during the live mystery shopping event may be presented on the screen via the media player module 114. In one implementation, the interface module 118 is configured to provide one or more interface elements overlaying the media player module 114 to interface with the mystery shopping module 230. In one implementation, the interface screen 300d includes a real-time rating interface 340. The real-time rating interface 340 is an interface element provided for viewers to rate the performer's performance at any instance of time during a stream of the live mystery shopping event. In one implementation, viewers can operate the real-time rating interface 340 more than once to rate the performer's performance at different instances of time during the live mystery shopping event. For example, viewers can enter different ratings at different instances of time during a stream of the live mystery shopping event. As an exemplary illustration, the real-time rating interface 340 may include at least a bipolar three-point rating scale having "Good", "Neutral" and "Poor" response options for rating particular instances of the performer's performance during the live mystery shopping event. It is to be appreciated that the real-time rating interface 340 may also be configured to include additional scale points to more reliably reflect viewers' level of contentment for the performer's performance at different instances of time. For example, the real-time rating interface 340 may be configured to include a bipolar five-point rating scale having "Very Good", "Good", "Neutral", "Poor", and "Very Poor" response options. Providing other configurations of bipolar rating scale may also be useful. A numerical value 342 is displayed below each response option to represent the number of times the corresponding response option was selected by viewers during the stream of the live mystery shopping event.

In one implementation, the real-time rating interface 340 can also translate into a performance graph 350 the aggregate number of times each response option was selected during a stream of the live mystery event. For example, each response option provided by the real-time rating interface 340 can include an intrinsic numerical score for calculating viewers' overall level of contentment for the performer's performance. For example, the "Good" response option may include an intrinsic score value equal to +1; the "Neutral" response option may include an intrinsic score value equal to 0; and the "Poor" response option may include an intrinsic score value equal to −1. Configuring each response option with other internal numerical score values may also be useful, depending on performance requirements. The aggregate score generated by the real-time rating interface 340 in one instance of time can be stored and used to calculate the new aggregate score in the next instance of time. The real-time rating interface 340 can continuously calculated the aggregate score at predefined time intervals (e.g., every 5 seconds) and translate the aggregate scores into data points of the performance graph 350 displayed on the interface screen 300d to map (or measure) the overall level of contentment for the performer's performance at different instances of time during a stream of the live mystery event.

For example, the performance graph 350 plots a continually extending timeline as denoted by the x-axis against an aggregate score of the performer's performance at different instances in the timeline as denoted by the y-axis.

A digital representation of the live mystery shopping event can be generated and stored as a video file in the learning content repository for further review and analysis after the end of the live mystery shopping event. For example, the digital representation of the live mystery shopping event includes a video recording of the live mystery shopping event integrated and synchronized with the real-time rating interface 340 to present any changes in the numerical values of the bipolar rating scale and the performance graph 350 during a playback of the mystery shopping event. The video recording can be used as feedback on a course (e.g., customer service course) or a performer; or as reference material for a course implemented in the system.

The system 100 disclosed herein is a digital learning platform that utilizes a LMS 160 in conjunction with a CMS 150. The CMS and LMS are implemented integrally on a digital platform in the form of an App. Users 180 of the system are associated to various types of registered user accounts, including learner accounts associated to learners. In the system 100, learners are selectively allocated and assigned (or invited) access to learning objects and live events depending on the courses they are enrolled in. This facilitates management and targeted delivery of relevant education programs (or training programs) which are of interest to each learner in the system 100. The system 100 includes a live event module 228 which allows trainers to conduct and broadcast live training events to a group of learners who may be spatially separated over one or more geographical locations, and a messaging module that allows learners in remote attendance to communicate in real-time with the trainer conducting the live event. For example, learners may share opinions and direct questions to the trainer or to other learners during a stream of the live training event through the messaging module. This provides learners with an interactive and engaging learning experience. The system 100 includes a quiz module which allows trainers to conduct assessment activities during a live training event. Providing quizzes during a live training event reinforces the concepts and information communicated during the live training event. The system includes a real-time rating interface 330 provided for a live event conducted by a trainer. The real-time rating interface 330 provides trainers with real-time feedback from viewers (learners in remote attendance) on the effectiveness of the teaching process during a particular live training event. This allows trainers the option of changing pedagogic approaches during the live training event to improve the effectiveness of the teaching process. A trainer's selection of pedagogic approach is validated when the average rating value displayed by the real-time rating interface 330 increases prior to the end of the live event. As a consequence, the real-time rating interface 330 assists and encourages trainers to identify a pedagogic approach which meets the particular learning needs of different groups of learners during a live training event, or in subsequent live training events.

The system 100 includes a mystery shopping module which allows designated mystery shoppers to broadcast live mystery shopping events to learners and/or other types of users 180 in the system 100 for rating particular instances of a performer's performance during a stream of the live mystery shopping. For example, a second mystery shopper may also be assigned access to remotely attend the live mystery shopping event for the purpose of evaluating a predetermined performer's performance during a stream of the live mystery shopping event. A digital representation of the live mystery shopping event can be stored for further review after the broadcast of the live mystery shopping event has ended.

Consumer Service Companies (CSCs, entities such as retailers, healthcare providers, hospitality providers or other entities delivering face-to-face service through one or more service outlets may find it challenging to measure and report on the service performance of their employees working in service outlets and of the service outlets themselves. The mystery shopping module can also be utilized to generate a video report for CSCs to evaluate their service staff's performances. By incorporating a video recording of the performer's performance with a real-time rating interface 340 and a performance graph 350, the performer's performance can be more reliably evaluated by multiple evaluators as compared to conventional mystery shopping events which are subjectively assessed by a mystery shopper. In addition, any negative results delivered to the performer (e.g., service staff) can be backed up with video data to illustrate why or how the judgement was made.

Performance-related data collected from the mystery shopping event can be used as feedback on the effectiveness of a particular course (e.g., customer service course) or a particular performer who may or may not have a learner account maintained in the system 100. For example, an employer may use the mystery shopping module to compare the performances and/or behavioral aspects of employees before and/or after enrolling the employees in one or more courses implemented in the system 100. Alternatively, the live mystery shopping event may also be utilized as a learning activity for learners (e.g., users 180 enrolled into a customer service course maintained in the system 100) to observe particular examples of desirable and undesirable interpersonal interactions, and for trainers (or employers) to drive and support any necessary or desired front line customer service behavior change.

The implementations of the computer or computer devices (e.g., client devices and server computers) described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. As used herein, the term "processor" should be understood as encompassing any of the foregoing hardware, either singly or in combination. Further, portions of each of the client devices and each of the server computers described herein do not necessarily have to be implemented in the same manner.

At least one implementation of the present disclosure relates to an apparatus for performing the operations/functionalities described herein. This apparatus may comprise special purpose computers/processors, or a general-purpose computer, selectively activated or reconfigured by a computer program stored on a non-transitory computer-readable storage medium that can be accessed by the computer.

All or a portion of the implementations of the disclosure can take the form of a computer program product accessible from, for example, a non-transitory computer usable or computer-readable medium. The computer program, when executed, can carry out any of the respective operations, methods, functionalities and/or instructions described herein. A non-transitory computer-usable or computer-readable medium can be any device that can, for example, tangibly contain, store, communicate, or transport the program for use by or in connection with any processor. The non-transitory medium can be, for example, any type of disk including floppy disks, optical disks, CD-ROMs, magnetic-optical disks, ROM, RAM, EPROM (erasable programmable read-only memory), EEPROM (electrically erasable programmable read-only memory), magnetic or optical cards, ASICs, or any type of media suitable for tangibly containing, storing, communicating, or transporting electronic instructions.

Also, the particular division of functionality between the various system components described herein is merely exemplary, and not mandatory; functions performed by a single system component may instead be performed by multiple components, and functions performed by multiple components may instead performed by a single component. Operations that are described as being performed by a single processor, computer, or device can be distributed across a number of different processors, computers or devices. Similarly, operations that are described as being performed by different processors, computers, or devices can, in some cases, be performed by a single processor, computer or device.

Unless specifically stated otherwise, it is appreciated that throughout the description, discussions utilizing terms such as, for example, "processing", "computing", "calculating", "displaying", "determining", "establishing", "analyzing", "checking", or the like, refer to operation(s) and/or process(es) of a computer, a computing platform, a computing system, or other electronic computing device, that manipulate and/or transform data represented as physical (e.g., electronic) quantities within the computer's memories and/or registers into other data similarly represented as physical quantities within the computer's memories and/or registers or other information storage medium that may store instructions to perform operations and/or processes.

The term "trainer" as used herein includes, for example, a teacher, an instructor, a designated learner acting in a role of a trainer, an education providing person, a member of an education system, a person that conveys information or knowledge to a group of learners in a computerized environment (e.g., digital learning platform), a person that performs teaching activities remotely, or the like.

The term "learner" as used herein includes, for example, a minor, a minor student, an adult, an adult student, a person acting in a learning role, a learning person, a person that receives information or knowledge from a trainer in a computerized environment (e.g., digital learning platform), a person that performs learning activities remotely, or the like.

The term "a group of learners" as used herein includes, for example, a grouping of learners who may be associated with a teaching activity or a learning activity; a grouping of learners who may spatially separated over one or more geographical locations and are associated with a course, performing a learning activity remotely, or attending a live event remotely; a grouping of learners which may include learners learning from their homes, learners learning from remote locations (e.g., a library, a remote computing station, a portable computer); or the like.

The term "performer" as used herein includes, for example, a trainer, a learner, a learner acting in the role of a trainer, a person performing an act of interest in a live event, a person who is the center of attention in a live event, a person in a live event who is being viewed by a plurality of other persons from remote locations (e.g., a library, a remote computing station, a portable computer), a person communicating information or knowledge to a group of learners in a computerized environment (e.g., digital learning platform), a person that is associated with a site and is engaged in any interpersonal interaction at the site with another person not associated with the site, a person that is performing in what may be viewed by learners as a performance of interest.

The term "performance" as used herein includes, for example, a teaching performance, a performance by a trainer, a performance during a teaching/learning activity conducted by a trainer, a performance during a live event involving a trainer during which that trainer is in communication with a group of learners remotely viewing a stream of the live event, a live service performance, a performance by one or more representatives of a commercial entity, a performance at a remote walk-in service premise owned by the commercial entity, a performance during an interaction between the one or more representatives of the business entity in a non-customer facing work setting, a performance during a live event involving at least one video feed (e.g., image and audio feed) of the one or more representative of the business entity interacting with a third party, and a performance during a meeting involving an individual of interest with one or more third parties during which that individual is practicing a specific behavior.

The term "mystery shopper" as used herein includes, for example, a person conducting a mystery shopping event, a customer not adept at evaluating the quality of live service performances, a reviewer adept at evaluating the quality of live service performances, a designated trainer acting in a role of a mystery shopper, and a person employed in a position other than that of the performer's direct supervisor, manager or team leader.

The term "viewer" as used herein includes, for example, any individual remotely viewing a live event provided on the learning platform.

The term "or" as used herein is intended to mean an inclusive "or" rather than an exclusive "or", unless specified otherwise, or clear from context. In addition, the articles "a" and "an" as used herein should generally be construed to mean "one or more" unless specified otherwise or clear from context to be directed to a singular form.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

What is claimed is:

1. A method comprising:
providing a learning platform, the learning platform comprising a learning management system and a content management system in communication with the learning management system;
providing a course for a group of viewers to enrolled into by a course module of the learning management system;
presenting, by a processing device, a live event provided by the learning platform, the live event having a performance by a performer, wherein the live event is presented on screens of client devices associated to the group of viewers viewing a stream of the live event;
presenting, on the screens of the client devices of the group of viewers, a real-time rating interface provided by the learning platform, wherein the real-time rating interface is operable by the viewers at any instance of time during the stream of the live event to rate the performance of the performer; and
updating the learning platform, wherein updating the learning platform comprises
building a new course by copying and/or modifying content of the course by the content management system, wherein copying and/or modifying the content of the course includes adding live event content to content of the new course, and
storing the new course content into the course module of the learning management system.

2. The method of claim 1 wherein the performance by the performer corresponds to a trainer conducting a presentation, and the group of viewers are a group of learners enrolled into the course provided by the learning platform, wherein the trainer is using a client device to communicate with the group of learners viewing the stream of the live event.

3. The method of claim 2 comprising:
presenting, within a messaging interface provided by the learning platform, a plurality of messages of at least first and second learners of the group of learners while presenting the live event on the screens of the client devices of the group of learners, wherein the messages of the first and second learners are presented on a screen of the client device of the trainer and on the screens of the client devices of the group of learners, wherein the messages are entered by the first and second learners via the messaging interface during the stream of the live event.

4. The method of claim 3 comprising:
storing the messages of the first and second learners in the learning platform; and
capturing the stream of the live event to generate a video file containing a video recording of the live event, wherein the video file is integrated and synchronized with the stored messages of the first and second learners.

5. The method of claim 1 wherein the live event is a live mystery shopping event conducted by a mystery shopper, and the group of viewers are a group of learners enrolled into the course provided by the learning platform, wherein the mystery shopper is using a client device associated to the mystery shopper to stream the live mystery shopping event to the group of learners viewing the stream of the live mystery shopping event.

6. The method of claim 5 wherein the real-time rating interface provided by the learning platform includes a bipolar rating scale which is operable by the group of learners to rate the performer's performance at different instances of time during the stream of the live mystery shopping event.

7. The method of claim 6 comprising:
presenting, on the screens of the client devices of the group of learners, a performance graph comprising data points defined by the real-time interface.

8. A system comprising:
a memory; and
a processing device coupled to the memory, the processing device to:
provide a course for a group of viewers by a learning platform, wherein the learning platform comprises a learning management system and a content management system in communication with the learning management system,
present a live event provided by the learning platform, the live event having a performance by a performer, wherein the live event is presented on screens of client devices associated to the group of viewers viewing a stream of the live event present, on the screens of the client devices of the group of viewers, a real-time rating interface provided by the learning platform, wherein the real-time rating interface is operable by the viewers at any instance of time during the stream of the live event to rate the performance of the performer, and update the learning platform, wherein update the learning platform comprises building a new course by copying and/or modifying content of the course by the content management system, wherein copying and/or modifying the content of the course includes adding live event content to content of the new course, and storing the new course content into the course module of the learning management system.

9. The system of claim 8 wherein the performance by the performer includes a trainer conducting a presentation, and the group of viewers are a group of learners enrolled into the course provided by the learning platform, wherein the trainer is using a client device to communicate with the group of learners viewing the stream of the live event.

10. The system of claim 9 comprising:
presenting, within a messaging interface provided by the learning platform, a plurality of messages of at least first and second learners of the group of learners while presenting the live event on the screens of the client devices of the group of learners, wherein the messages of the first and second learners are presented on a screen of the client device of the trainer and on the screens of the client devices of the group of learners, wherein the messages are entered by the first and second learners via the messaging interface and presented within the messaging interface during the stream of the live event.

11. The system of claim 10 comprising:
storing the messages of the first and second learners in the learning platform; and
capturing the stream of the live event to generate a video file containing a video recording of the live event, wherein the video file is integrated and synchronized with the stored messages of the first and second learners.

12. The system of claim 8 wherein the live event is a live mystery shopping event conducted by a mystery shopper, and the group of viewers are a group of learners enrolled into the course provided by the learning platform, wherein the mystery shopper is using a client device associated to the mystery shopper to stream the live mystery shopping event to the group of learners viewing the stream of the live mystery shopping event.

13. The system of claim 12 wherein the real-time rating interface provided by the learning platform includes a bipolar rating scale which is operable by the group of learners to rate the performer's performance at different instances of time during the stream of the live mystery shopping event.

14. The system of claim 13 comprising:
presenting, on the screens of the client devices of the group of learners, a performance graph comprising data points defined by the real-time interface.

15. A non-transitory computer readable storage medium including instructions that, when executed by a processing device, cause the processing device to perform operations comprising:

providing a course for a group of viewers by a learning platform, wherein the learning platform comprises a learning management system;

presenting, by the processing device, a live event provided by the learning platform, the live event having a performance by a performer, wherein the live event is presented on screens of client devices associated to the group of viewers viewing a stream of the live event;

presenting, on the screens of the client devices of the group of viewers, a real-time rating interface provided by the learning platform, wherein the real-time rating interface is operable by the viewers at any instance of time during the stream of the live event to rate the performance of the performer; and updating the learning platform, wherein updating the learning platform comprises building a new course by copying and/or modifying content of the course by the content management system, wherein copying and/or modifying the content of the course includes adding live event content to content of the new course, and storing the new course content into the course module of the learning management system.

16. The non-transitory computer readable storage medium of claim 15 wherein the performance by the performer includes a trainer conducting a presentation, and the group of viewers is a group of learners enrolled into the course provided by the learning platform, wherein the trainer is using a client device to communicate with the group of learners viewing the stream of the live event.

17. The non-transitory computer readable storage medium of claim 16 comprising:
presenting, within a messaging interface provided by the learning platform, a plurality of messages of at least first and second learners of the group of learners while presenting the live event on the screens of the client devices of the group of learners, wherein the messages of the first and second learners are presented on a screen of the client device of the trainer and on the screens of the client devices of the group of learners, wherein the messages are entered by the first and second learners via the messaging interface and presented within the messaging interface during the stream of the live event.

18. The non-transitory computer readable storage medium of claim 17 comprising:
storing the messages of the first and second learners in the learning platform; and
capturing the stream of the live event to generate a video file containing a video recording of the live event, wherein the video file is integrated and synchronized with the stored messages of the first and second learners.

19. The non-transitory computer readable storage medium of claim 15 wherein the live event is a live mystery shopping event conducted by a mystery shopper, and the group of viewers are a group of learners enrolled into the course provided by the learning platform, wherein the mystery shopper is using a client device associated to the mystery shopper to stream the live mystery shopping event to the group of learners viewing the stream of the live mystery shopping event.

20. The non-transitory computer readable storage medium of claim 19 wherein the real-time rating interface provided by the learning platform includes a bipolar rating scale which is operable by the group of learners to rate the performer's performance at different instances of time during the stream of the live mystery shopping event.

\* \* \* \* \*